(12) United States Patent
Fay, II et al.

(10) Patent No.: US 9,596,808 B2
(45) Date of Patent: Mar. 21, 2017

(54) TRANSPORT SYSTEM FOR A CENTER PIVOT AGRICULTURAL MACHINE

(71) Applicant: CNH Industrial America LLC, New Holland, PA (US)

(72) Inventors: Jeffrey B. Fay, II, Lititz, PA (US); Brendon Earl, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 63 days.

(21) Appl. No.: 14/265,917

(22) Filed: Apr. 30, 2014

(65) Prior Publication Data
US 2015/0313083 A1    Nov. 5, 2015

(51) Int. Cl.
*A01B 73/00*    (2006.01)
*A01D 75/00*    (2006.01)

(52) U.S. Cl.
CPC .......... *A01D 75/004* (2013.01); *A01B 73/005* (2013.01)

(58) Field of Classification Search
CPC ....... A01B 73/005; A01B 63/22; A01B 51/04; A01B 59/042; A01B 63/16; A01B 73/00; A01B 73/065; A01D 75/002; B62D 53/062
USPC ........ 280/656, 400, 409, 462, 475; 414/703; 172/625, 240, 310, 452, 421; 56/228, 56/14.9
See application file for complete search history.

(56) References Cited

U.S. PATENT DOCUMENTS

| | | | |
|---|---|---|---|
| 1,421,439 A | 7/1922 | Finckh | |
| 2,109,098 A | 2/1938 | Baxter | |
| 2,286,305 A | 6/1942 | Priestley | |
| 2,540,228 A | 2/1951 | Adkisson | |
| 2,833,105 A * | 5/1958 | Naery | A01B 73/005 56/15.6 |
| 2,911,780 A | 11/1959 | Brady | |
| 2,938,588 A | 5/1960 | Stein | |
| 3,241,300 A | 3/1966 | Fell et al. | |
| 3,245,695 A * | 4/1966 | Bernard | A01D 75/002 280/400 |
| 3,288,480 A * | 11/1966 | Calkins | A01B 39/19 172/413 |
| 3,408,956 A | 11/1968 | Rebenok et al. | |
| 3,515,408 A * | 6/1970 | Cagle | B62D 53/062 172/240 |

(Continued)

FOREIGN PATENT DOCUMENTS

| | | |
|---|---|---|
| DE | 4309498 | 9/1994 |
| DE | 20113820 U1 | 12/2001 |

(Continued)

OTHER PUBLICATIONS

Specification of U.S. Appl. No. 15/099,827, entitled "Pull-Type Disk Mowing Machine Transport System," MacDon Industries Ltd. & Maschinenfabrik Bernard Krone GmbH Applicants, 45 pp.

(Continued)

*Primary Examiner* — Árpád Fábián-Kovács
(74) *Attorney, Agent, or Firm* — Peter K. Zacharias; Patrick M. Sheldrake (57) ABSTRACT

An agricultural mower including a chassis, a pivotal tongue coupled to the chassis and a transport arrangement coupled to the chassis. The transport arrangement has a first suspension element pivotal about a first axis and a second suspension element pivotal about a second axis. The second suspension element additionally being pivotal about the first axis.

20 Claims, 8 Drawing Sheets

(56) References Cited

U.S. PATENT DOCUMENTS

| | | | |
|---|---|---|---|
| 3,523,410 A | 8/1970 | Taylor et al. | |
| 3,577,713 A | 5/1971 | McCarty et al. | |
| 3,590,928 A | 7/1971 | Mirus | |
| 3,648,780 A | 3/1972 | Fueslein et al. | |
| 3,683,602 A | 8/1972 | Scarnato et al. | |
| 3,721,073 A | 3/1973 | Scarnato et al. | |
| 3,786,764 A | 1/1974 | Beers, Jr. et al. | |
| 3,814,191 A | 6/1974 | Tilbury | |
| 3,841,070 A | 10/1974 | Scarnato et al. | |
| 3,881,301 A | 5/1975 | Sawyer et al. | |
| 3,897,832 A | 8/1975 | Leedahl et al. | |
| 3,911,649 A | 10/1975 | Scarnato et al. | |
| 3,919,831 A | 11/1975 | Halls et al. | |
| 3,955,627 A | 5/1976 | Brown | |
| 4,026,365 A * | 5/1977 | Andersson | A01B 63/22 172/386 |
| 4,043,403 A | 8/1977 | Anderson et al. | |
| 4,099,364 A | 7/1978 | Kanengieter et al. | |
| 4,106,788 A | 8/1978 | Bohnert | |
| 4,106,813 A | 8/1978 | Goodbary | |
| 4,119,329 A * | 10/1978 | Smith | A01B 51/04 172/240 |
| 4,162,085 A | 7/1979 | Miranowski | |
| 4,180,135 A | 12/1979 | Birkenbach et al. | |
| 4,222,334 A | 9/1980 | Peterson | |
| 4,283,071 A | 8/1981 | Pedersen | |
| 4,316,511 A | 2/1982 | Andersen | |
| 4,361,341 A | 11/1982 | Gustafson | |
| 4,418,516 A | 12/1983 | Donovan et al. | |
| 4,418,517 A | 12/1983 | Ehrhart et al. | |
| 4,418,518 A | 12/1983 | Koch et al. | |
| 4,435,948 A * | 3/1984 | Jennings | A01B 73/005 56/192 |
| 4,442,662 A * | 4/1984 | Jennings | A01B 73/005 172/625 |
| 4,455,034 A * | 6/1984 | de Graff | A01B 73/005 172/679 |
| 4,460,193 A * | 7/1984 | Dietz | A01D 67/005 172/248 |
| 4,506,904 A * | 3/1985 | Kinzenbaw | A01B 73/005 172/248 |
| 4,512,416 A | 4/1985 | Smith | |
| 4,526,235 A | 7/1985 | Kinzenbaw | |
| 4,534,416 A | 8/1985 | Johnson | |
| 4,552,375 A | 11/1985 | Kinzenbaw | |
| 4,558,560 A | 12/1985 | Koch | |
| 4,573,309 A | 3/1986 | Patterson | |
| 4,607,996 A | 8/1986 | Koch | |
| 4,660,654 A | 4/1987 | Wiebe et al. | |
| 4,662,646 A | 5/1987 | Schlapman et al. | |
| 4,682,462 A * | 7/1987 | Johnson, Sr. | A01B 73/005 172/383 |
| 4,765,639 A * | 8/1988 | Murray | A01B 73/005 172/625 |
| 4,831,814 A * | 5/1989 | Frisk | A01B 73/005 56/181 |
| 4,867,245 A | 9/1989 | Stevens | |
| 4,871,028 A * | 10/1989 | Murray | A01B 73/005 172/248 |
| 4,905,466 A | 3/1990 | Heppner | |
| 4,934,131 A * | 6/1990 | Frisk | A01B 73/005 56/15.5 |
| 4,986,064 A * | 1/1991 | Ermacora | A01B 73/005 280/415.1 |
| 4,991,383 A | 2/1991 | Ermarcora | |
| 5,000,268 A | 3/1991 | Zimmerman | A01C 15/005 172/240 |
| 5,024,279 A | 6/1991 | Warner et al. | |
| 5,025,616 A | 6/1991 | Moss | |
| 5,113,956 A | 5/1992 | Friesen et al. | |
| 5,136,828 A * | 8/1992 | Ermacora | A01B 63/00 280/43.23 |
| 5,199,250 A * | 4/1993 | Ermacora | A01B 73/005 56/15.2 |
| 5,243,810 A | 9/1993 | Fox et al. | |
| 5,274,990 A | 1/1994 | Aron et al. | |
| 5,429,195 A | 7/1995 | Turnis | |
| 5,566,536 A | 10/1996 | Krafka et al. | |
| 5,642,607 A | 7/1997 | Stephenson et al. | |
| 5,778,647 A | 7/1998 | McLean et al. | |
| 5,839,516 A | 11/1998 | Arnold et al. | |
| 5,901,533 A | 5/1999 | Ermacora et al. | |
| 5,930,988 A | 8/1999 | Hanson | |
| 5,943,848 A | 8/1999 | Rice et al. | |
| 6,152,240 A * | 11/2000 | Nonhoff | A01D 89/004 172/311 |
| 6,189,306 B1 * | 2/2001 | Walch | A01D 67/005 56/15.1 |
| 6,209,297 B1 * | 4/2001 | Yeomans | A01B 73/005 56/14.9 |
| 6,213,219 B1 | 4/2001 | Mosdal et al. | |
| 6,238,170 B1 * | 5/2001 | Pingry | A01B 51/04 172/311 |
| 6,260,629 B1 | 7/2001 | Toth | |
| 6,273,449 B1 | 8/2001 | Harkcom et al. | |
| 6,321,852 B1 | 11/2001 | Pratt | |
| 6,336,313 B1 | 1/2002 | Bonnewitz | |
| 6,360,516 B1 | 3/2002 | Harkcom et al. | |
| 6,408,950 B1 * | 6/2002 | Shoup | A01B 73/065 111/57 |
| 6,421,994 B1 | 7/2002 | Boucher et al. | |
| 6,485,246 B1 | 11/2002 | Harkcom et al. | |
| 6,546,708 B2 * | 4/2003 | Faivre | A01B 59/042 56/15.2 |
| 6,606,956 B1 | 8/2003 | Paluch | |
| 6,702,035 B1 | 3/2004 | Friesen | |
| 6,739,612 B2 * | 5/2004 | Colistro | A01B 59/042 172/313 |
| 6,854,251 B2 | 2/2005 | Snider | |
| 6,907,719 B2 * | 6/2005 | Ligouy | A01B 73/005 56/15.1 |
| 7,047,714 B1 | 5/2006 | Stephenson et al. | |
| 7,100,350 B2 | 9/2006 | Breneur | |
| 7,197,865 B1 | 4/2007 | Enns et al. | |
| 7,347,277 B2 * | 3/2008 | Enns | A01B 73/005 172/311 |
| 7,552,579 B2 | 6/2009 | Tippery et al. | |
| 7,712,544 B1 | 5/2010 | Misenhelder et al. | |
| 7,849,933 B2 | 12/2010 | Marggi | |
| 7,926,249 B1 | 4/2011 | Cook | |
| 8,112,977 B2 | 2/2012 | Priepke | |
| 8,141,652 B2 | 3/2012 | Poole et al. | |
| 8,209,946 B2 | 7/2012 | Neudorf et al. | |
| 8,292,328 B2 * | 10/2012 | Honas | A01D 75/002 280/769 |
| 8,464,508 B2 | 6/2013 | Matousek et al. | |
| 9,179,591 B2 | 11/2015 | Barnett et al. | |
| 9,179,592 B2 | 11/2015 | Snider et al. | |
| 9,185,837 B2 | 11/2015 | Barnett et al. | |
| 9,185,838 B2 | 11/2015 | Chan et al. | |
| 9,185,839 B2 | 11/2015 | Kolegaev et al. | |
| 2002/0005629 A1 | 1/2002 | Rosenboom | |
| 2004/0011538 A1 | 1/2004 | Raducha et al. | |
| 2006/0123764 A1 | 6/2006 | McLean et al. | |
| 2009/0272551 A1 * | 11/2009 | Thompson | A01B 69/004 172/284 |
| 2011/0197561 A1 * | 8/2011 | Priepke | A01D 75/004 56/228 |
| 2011/0272917 A1 | 11/2011 | Hilsabeck et al. | |
| 2012/0132768 A1 | 5/2012 | Lammerant et al. | |
| 2013/0284467 A1 | 10/2013 | Snider et al. | |
| 2013/0284468 A1 | 10/2013 | Barnett et al. | |
| 2013/0284469 A1 * | 10/2013 | Barnett | A01B 63/22 172/452 |
| 2014/0053522 A1 | 2/2014 | Kolegaev et al. | |
| 2014/0083071 A1 | 3/2014 | Fay, II | |
| 2014/0096498 A1 | 4/2014 | Estock et al. | |
| 2014/0196429 A1 | 7/2014 | Gantzer | |

(56) References Cited

U.S. PATENT DOCUMENTS

2015/0282426 A1    10/2015   Gantzer et al.
2016/0007534 A1    1/2016   Fay, II

FOREIGN PATENT DOCUMENTS

| | | |
|---|---|---|
| EP | 0350513 A1 | 1/1990 |
| EP | 628237 | 12/1994 |
| EP | 764396 A1 | 3/1997 |
| EP | 818134 | 1/1998 |
| EP | 0 823 958 A2 | 2/1998 |
| EP | 823985 A2 | 2/1998 |
| EP | 1769668 | 4/2007 |
| FR | 2332690 A1 | 6/1977 |
| FR | 2 712 137 A3 | 5/1995 |
| FR | 2752356 | 2/1998 |
| GB | 2194872 | 3/1988 |
| GB | 2232055 | 12/1990 |
| GB | 2490342 | 10/2012 |
| GB | 2504093 A | 1/2014 |
| WO | 2013135676 A1 | 9/2013 |

OTHER PUBLICATIONS

Drawings of U.S. Appl. No. 15/099,827, entitled "Pull-Type Disk Mowing Machine Transport System," MacDon Industries Ltd. & Maschinenfabrik Bernard Krone GmbH Applicants, 16 pp.
EP Application No. 15165746, European Search Report, dated Aug. 31, 2015, 5 pp.
EP Application No. 15165746, Reply to an Invitation Pursuant to Rule 70a(1) EPC, tiled Apr. 29, 2016, 13 pp.

\* cited by examiner

TRANSPORT SYSTEM FOR A CENTER PIVOT AGRICULTURAL MACHINE

BACKGROUND

1. Field of the Invention

The subject disclosure relates to transport arrangements for agricultural machines, and, more particularly, relates to an arrangement for the machine, such as an agricultural mower, to enable the machine to be transported in less than its operating width.

2. Description of the Related Art

Agricultural mowers and mower/conditioners, hereinafter referred to simply as mowers, are well known and include self-propelled and pull-behind types. A problem with pull-behind mowers involves the transporting of the machines between fields, since the width of the machine may exceed practical or regulatory limits. Machine movement may be necessary over farm lanes, through gates or on highways where the machine width will not allow passage in the operating orientation.

A typically solution is to place the mower-conditioner header mechanism on a separate trailer such that the lateral width of the mechanism is generally aligned with the length of the trailer (lateral transport) and then tow the trailer with the tractor. One such example is the Discbine™ Transporter (by common assignee) which is specifically configured for loading, unloading, and laterally transporting a Model 1441/1442 disc mower conditioner while attached to the operating power unit (tractor). Such special trailers add significant cost, requires significant skill to load and unload, and must be used to transport the machine between locations or separately transported.

It would be advantageous to provide a reconfigurable transport arrangement for supporting a pull-behind mower header to be laterally transported while attached to a tractor without requiring an additional implement or special trailer. Further advantages would be realized by a lateral transport system that is quickly and easily operated thereby reducing the time necessary to reconfigure the implement between operating and lateral transport configurations. Still further advantages would be realized by a lateral transport system that can be produced with less cost that the separate trailer lateral transport option it replaces.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

The subject disclosure provides a reconfigurable transport arrangement for supporting a mower allowing lateral transportation of the mower while attached to a tractor without requiring an additional implement or special trailer.

The disclosure in one form is directed to a transport arrangement for an agricultural machine having a chassis and a field suspension system. The transport arrangement includes a first suspension element being pivotal about a first axis, and a second suspension element being pivotal about a second axis. The second suspension element additionally being pivotal about the first axis.

The disclosure in another form is directed to an agricultural mower including a chassis, a pivotal tongue coupled to the chassis and a transport arrangement coupled to the chassis. The transport arrangement has a first suspension element pivotal about a first axis and a second suspension element pivotal about a second axis. The second suspension element additionally being pivotal about the first axis.

An advantage of the subject disclosure is that the lateral transport mode is accomplished without a separate implement or trailer.

Another advantage is that the transport mode is achieved using hydraulic controls available on the tractor.

Yet another advantage is that the transport system is stowed on the back portion of the mower.

Yet another advantage is that the legs of the transport system are of differing lengths to enhance stability of the mower in the transport mode.

A further advantage is that the transport suspension is above the discharge zone of the mower and does not interfere with the flow of the crop material.

A still further advantage is that the transport arrangement doesn't negatively effect the balance of the mower.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

BRIEF DESCRIPTION OF THE DRAWINGS

The above-mentioned and other features and advantages of this disclosure, and the manner of attaining them, will become more apparent and the disclosure will be better understood by reference to the following description of an embodiment of the disclosure taken in conjunction with the accompanying drawings, wherein.

Corresponding reference characters indicate corresponding parts throughout the several views. The exemplification set out herein illustrates an embodiment of the subject disclosure, and such exemplification is not to be construed as limiting the scope of the subject disclosure in any manner.

DETAILED DESCRIPTION

Figure 1:
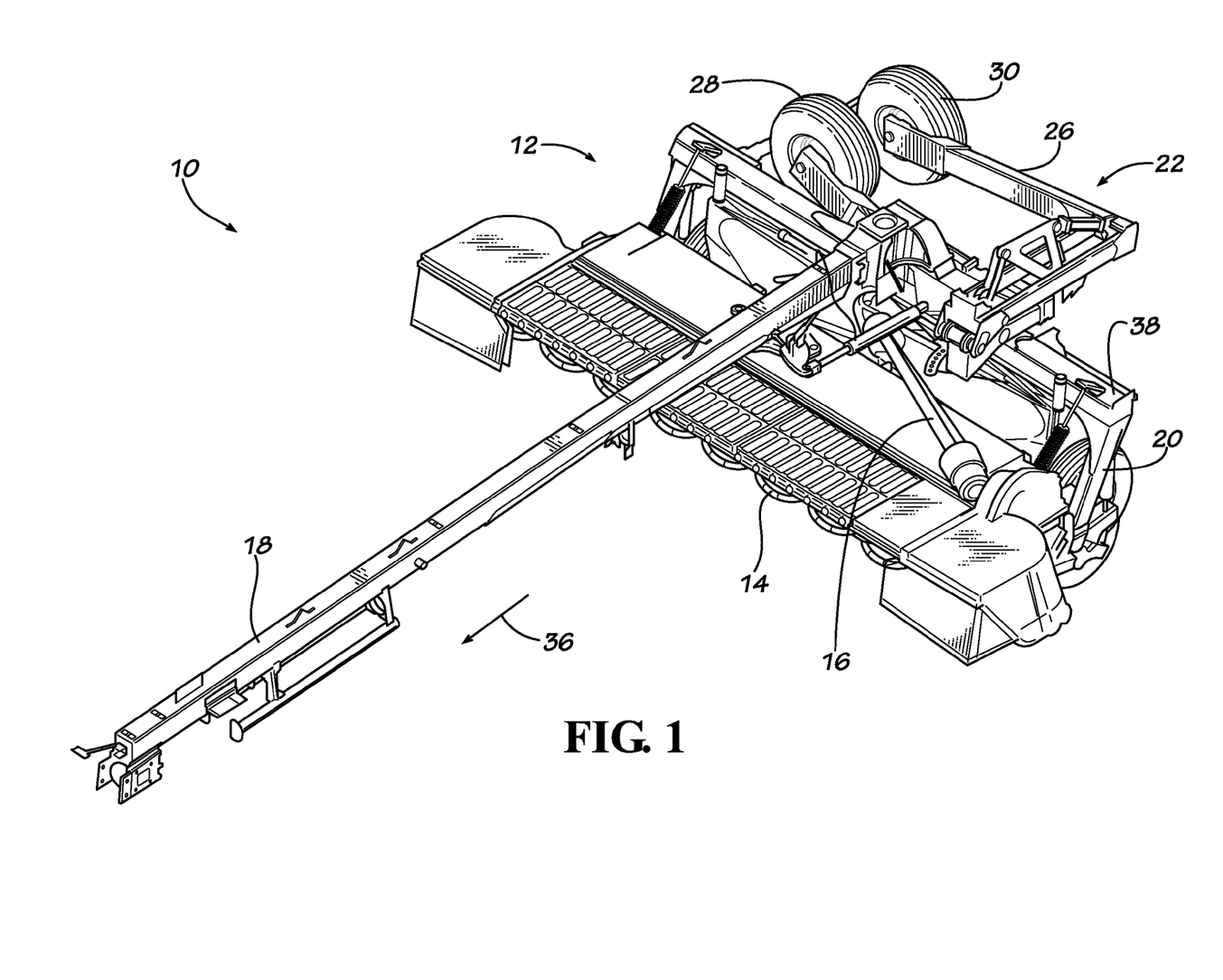
FIG. 1 is a perspective view of an agricultural machine in the form of a mower including an embodiment of a transport arrangement of the present application in the stowed position.

Referring now to the drawings, and more particularly to FIG. 1, there is shown a perspective view of an agricultural machine in the form of a mower 10, which can be attached to a tractor (not shown). Mower 10 generally includes a chassis 12, which carries a number of other components such as crop engaging blades 14, and drive components 16. A tongue 18 is pivotally connected to chassis 12, an end of which can be connected to the tractor. A field suspension system 20 supports mower 10 while mower 10 is in a field mode. Mower 10 additionally includes a transport arrangement 22, which, when deployed, provides the support for the transport of mower 10. Crop engaging blades 14 can be disc cutter blades 14 or a sickle bar, or another crop cutting device.

Now, additionally referring to FIGS. 2-8, transport arrangement 22 includes suspension elements 24 and 26, which respectively have wheels 28 and 30 connected to corresponding ends of suspension elements 24 and 26. Suspension elements 24 and 26 are rotatable about an axis 32, when suspension element 26 is in the position shown in FIGS. 4-8. Additionally, suspension element 26 is rotatable about an axis 34 as it transitions from a stowed position illustrated in FIGS. 1-3 to the position shown in FIG. 4. Axis 32 is generally perpendicular to axis 34.

When suspension element 26 is in the stowed position it is generally above, or at least vertically elevated above, suspension element 24. Additionally, suspension element 26 is somewhat shorter than suspension element 24, as can be particularly seen in FIG. 2, where it can also be seen that suspension element 26 is positioned such that wheel 30 is behind wheel 28 when transport arrangement 22 is in a stowed position.

Figure 2:
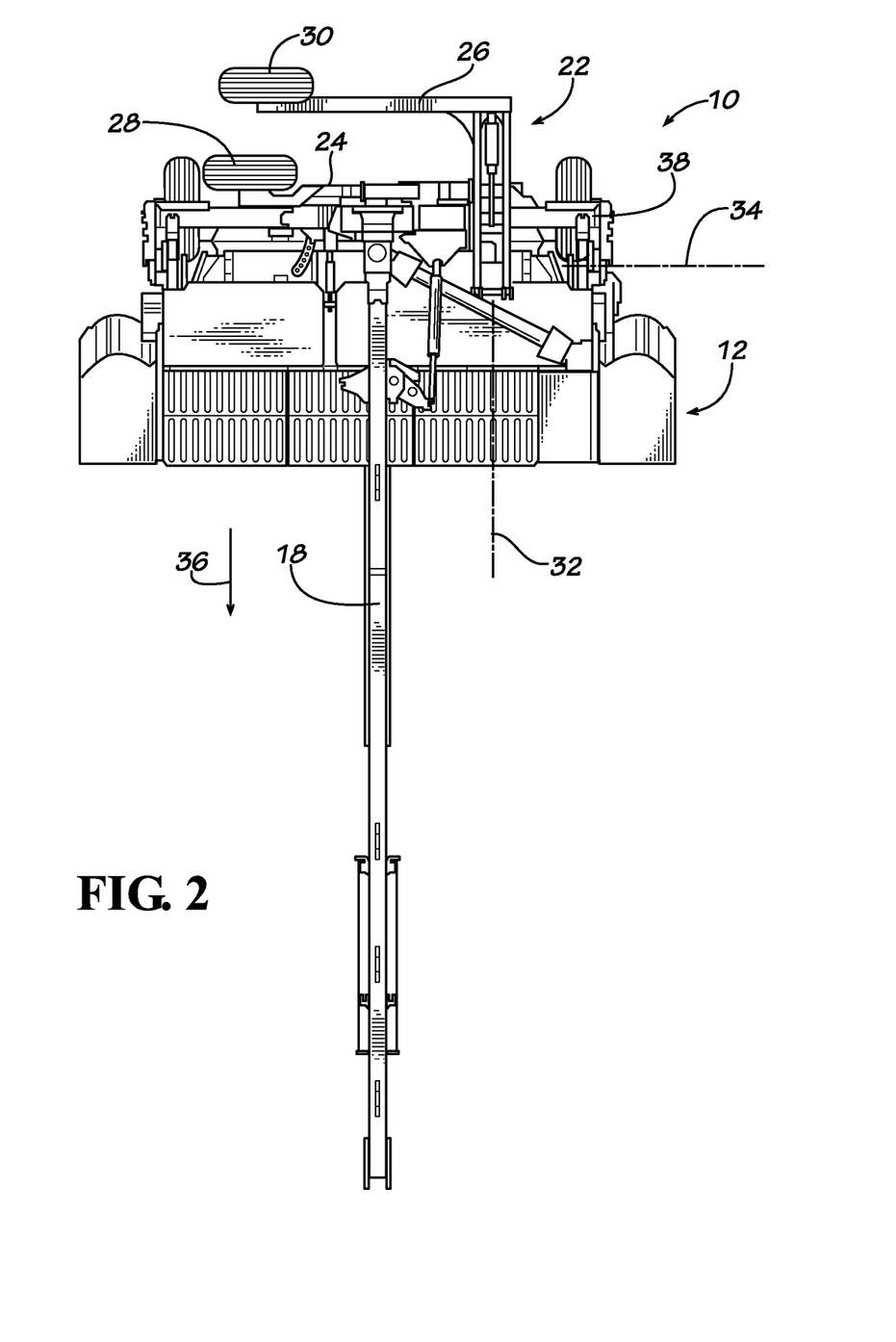
FIG. 2 is a top view of the mower with the transport arrangement shown in FIG. 1.
Figure 3:
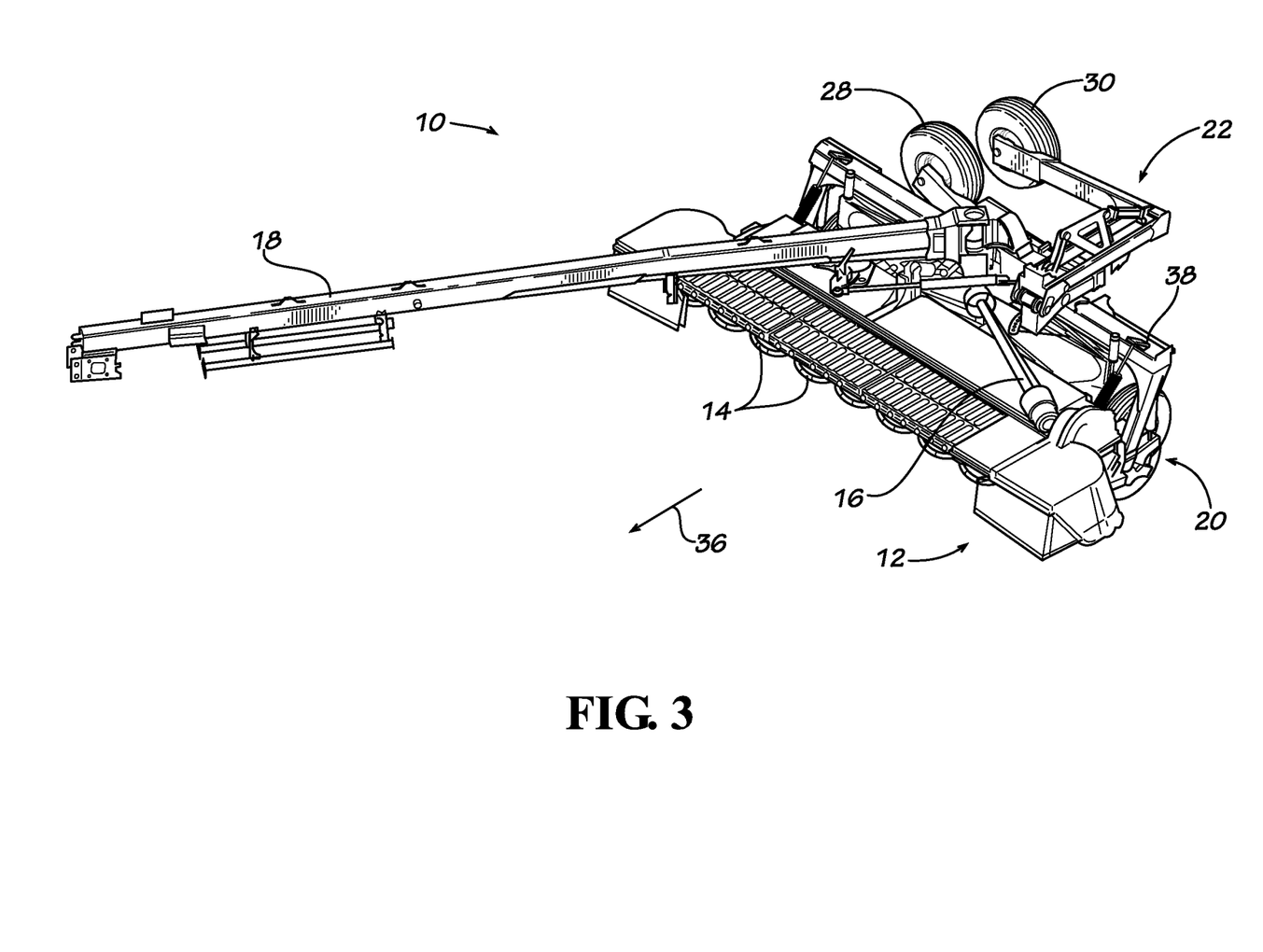
FIG. 3 is a perspective view of the mower shown in FIGS. 1 and 2, with the tongue shifted to a field use position.

A sequence of movements of the elements of mower 10 will now be discussed with references to the various figures. FIGS. 1 and 2 illustrate transport arrangement 22 in a stowed position and tongue 18 is angularly positioned in a substantially forward direction 36. This is a configuration in which mower 10 can be used, but generally mower 10 will be used with tongue 18 located to either side, such as that shown in FIG. 3. FIG. 3 illustrates a predetermined position for tongue 18 to be located to allow the needed clearance for suspension element 26 to rotate about axis 34, as shown fully deployed, in FIG. 4. Initially the field wheels associated with field suspension system 20 are fully extended to lift chassis 12.

Figure 4:
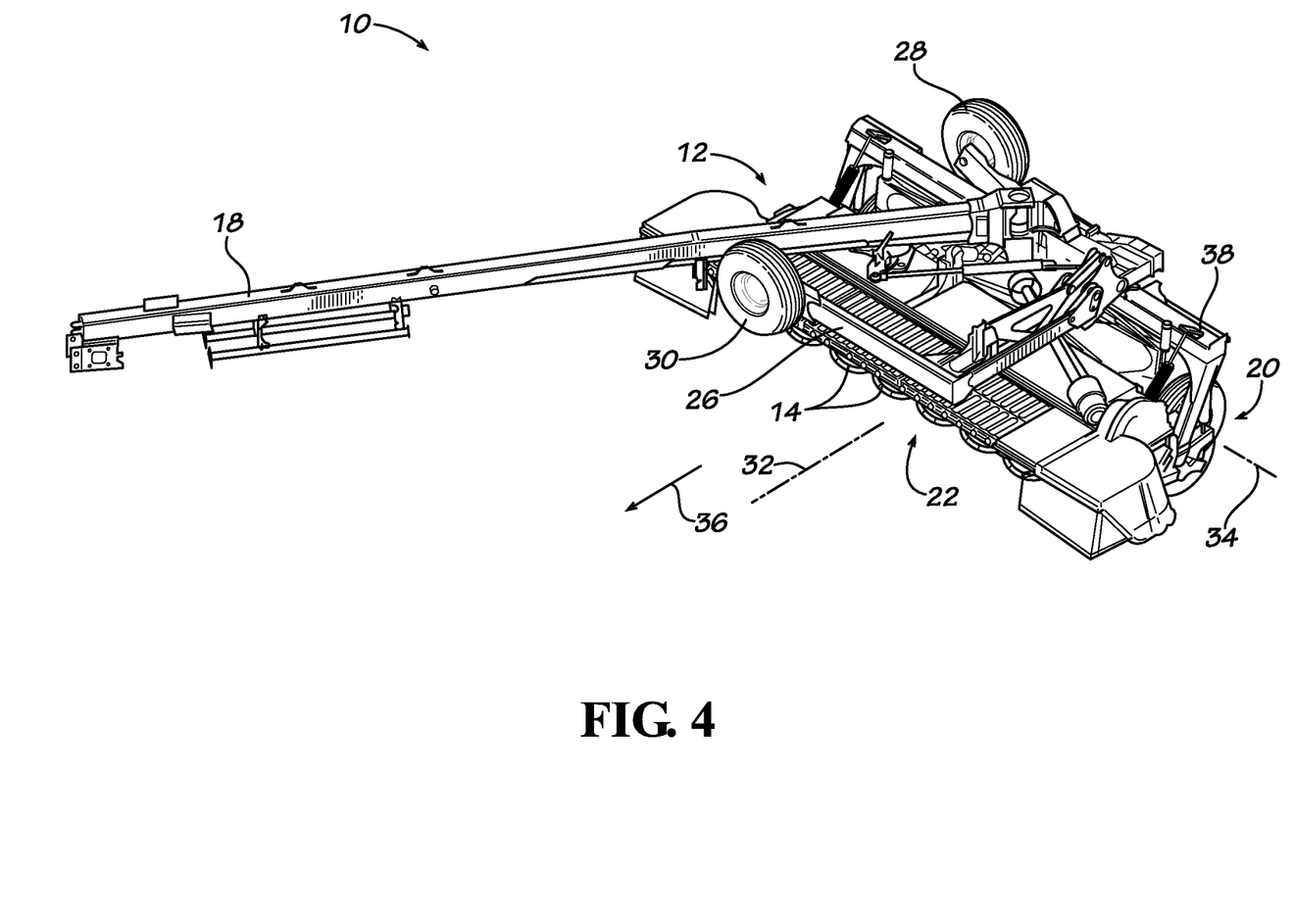
FIG. 4 is another perspective view of the mower of FIGS. 1-3, illustrating the transport arrangement of the present application being deployed.
Figure 5:
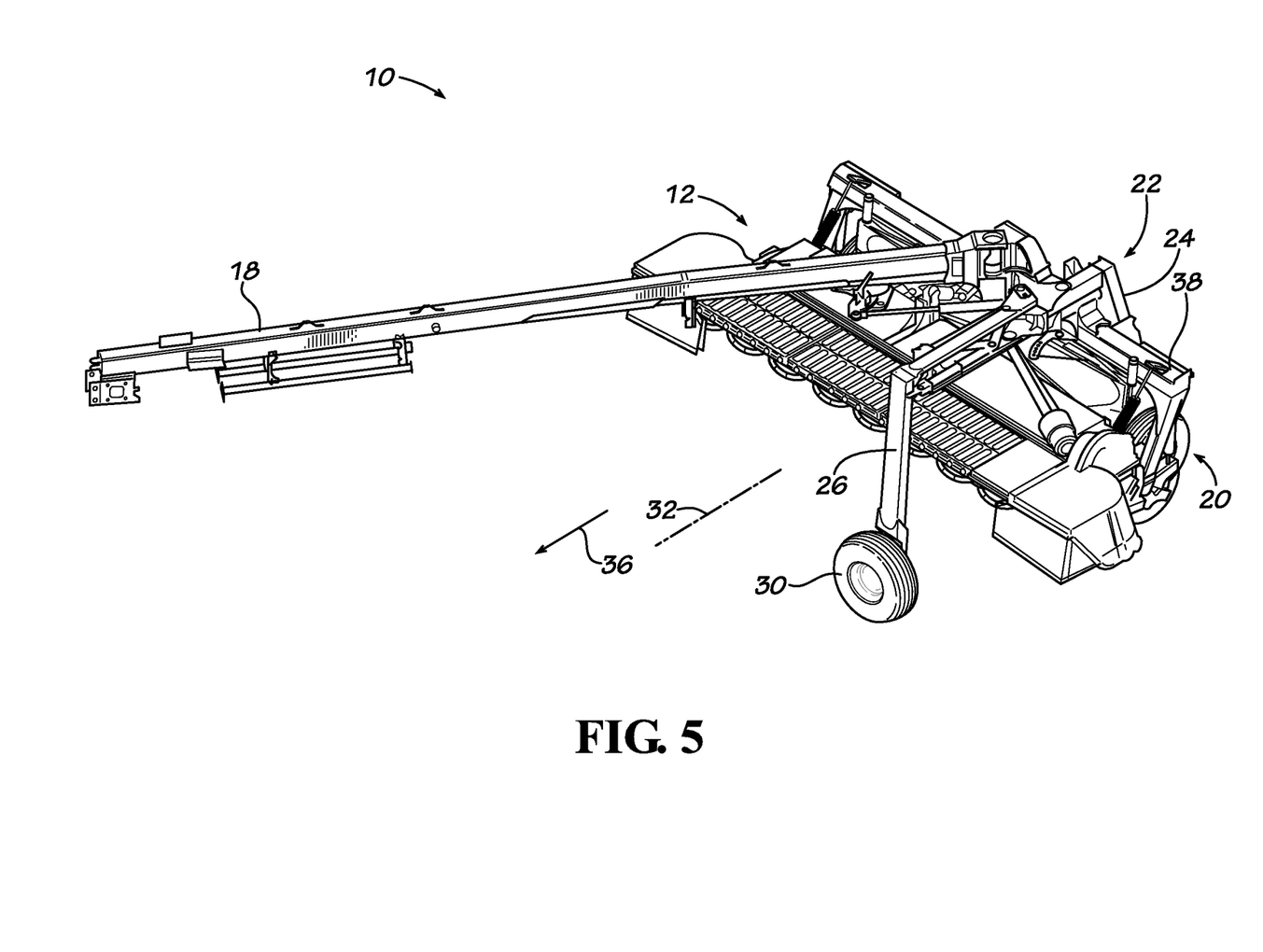
FIG. 5 is yet another perspective view of the mower of FIGS. 1-4, illustrating the transport arrangement of the present application being further deployed lifting the chassis of the mower.
Figure 7:
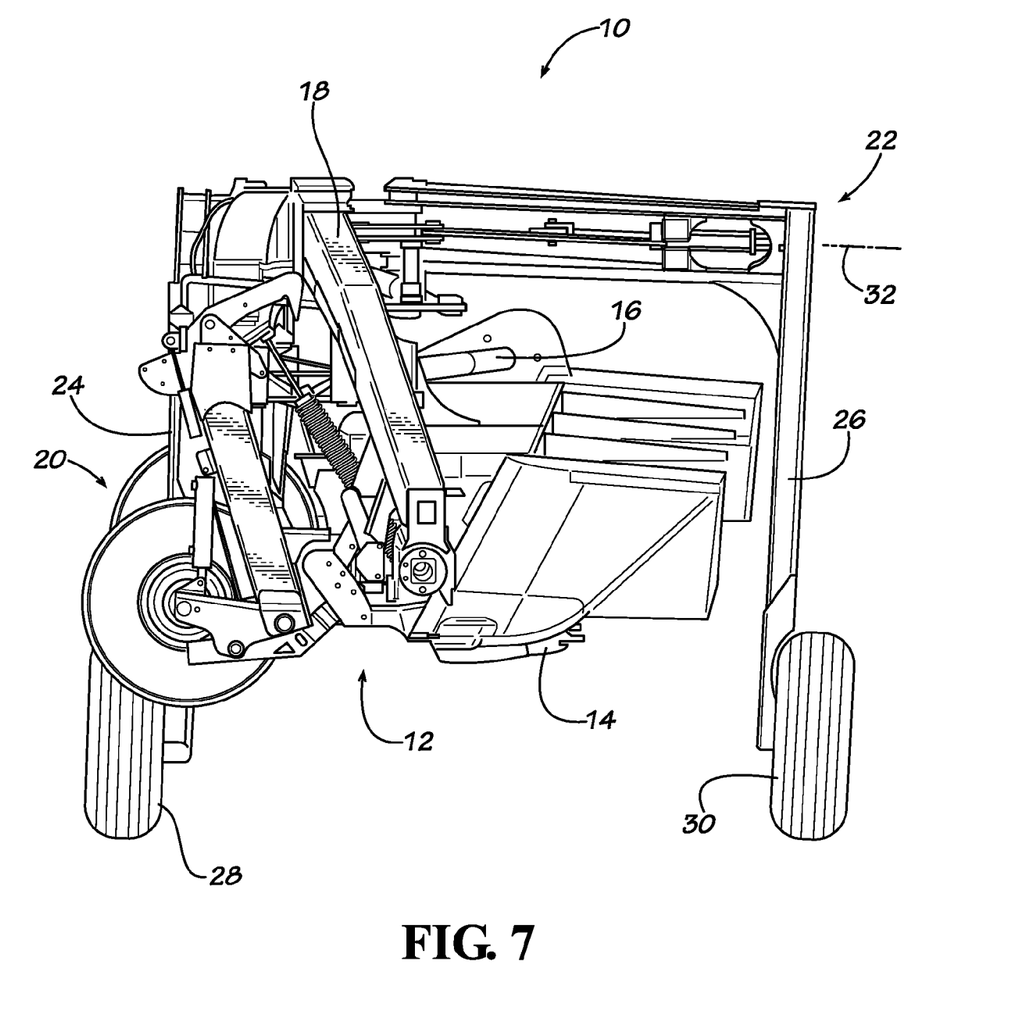
FIG. 7 is a front view of the mower of FIGS. 1-6, illustrating the transport arrangement of the present application being deployed for transporting the mower, from the perspective of the operator in a tractor.
Figure 8:
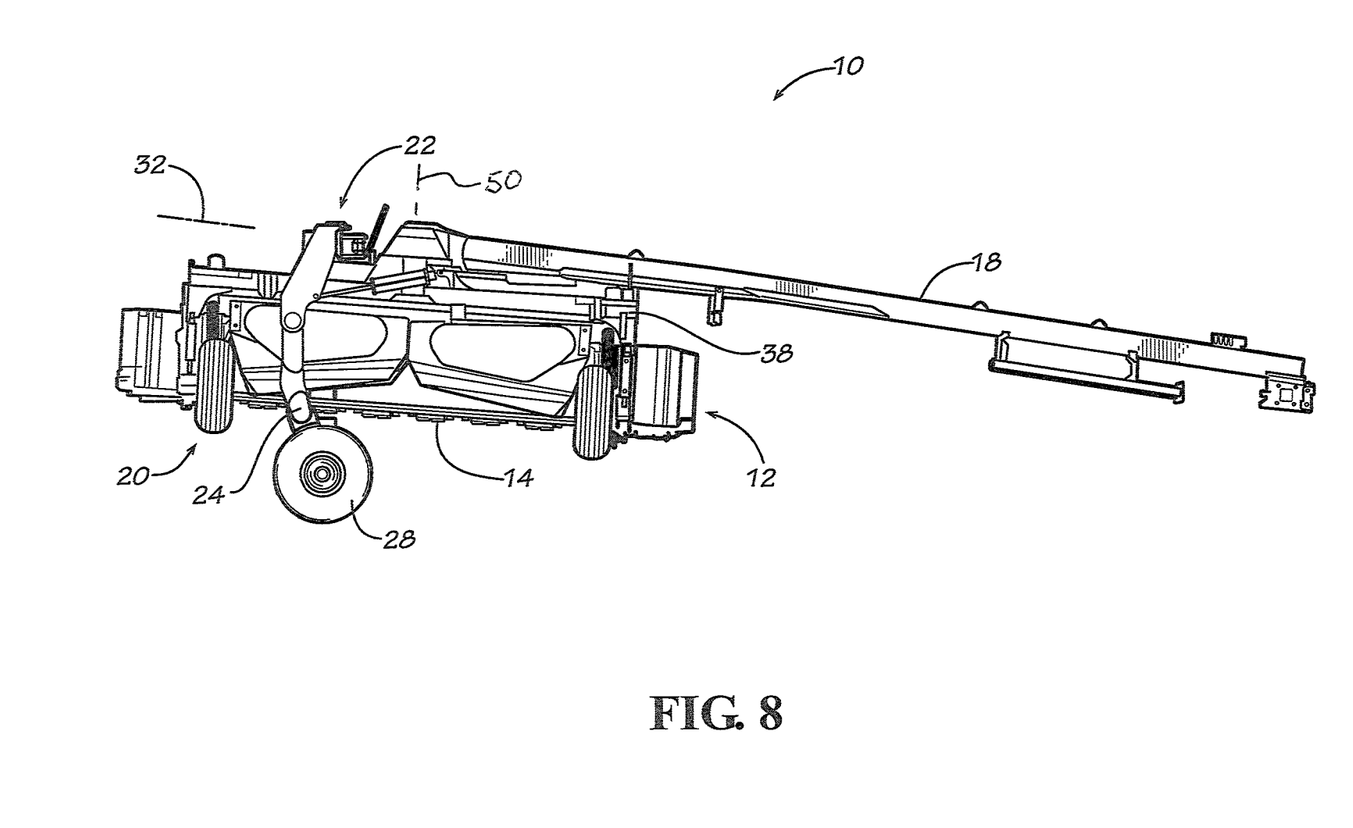
FIG. 8 is a side view of the mower of FIGS. 1-7, illustrating the transport arrangement of the present application being fully deployed having lifted the chassis of the mower.

Once transport arrangement 22 is positioned as shown in FIG. 4, then both suspension elements 24 and 26 rotate about axis 32 causing wheels 28 and 30 to contact the ground thereby lifting chassis 12 so that field suspension system 20 is lifted off of the ground. Field suspension system 20 can be coordinated to also lift its wheels while or after wheels 28 and 30 contact the ground. The wheels of field suspension system 20 are raised to provide ground clearance by the retraction of the lift cylinders associated with field suspension system 20 (as can be seen in FIGS. 7 and 8). A result of this step is that transport arrangement 22 is fully deployed as seen in FIG. 5 and is in the transport position.

Figure 6:
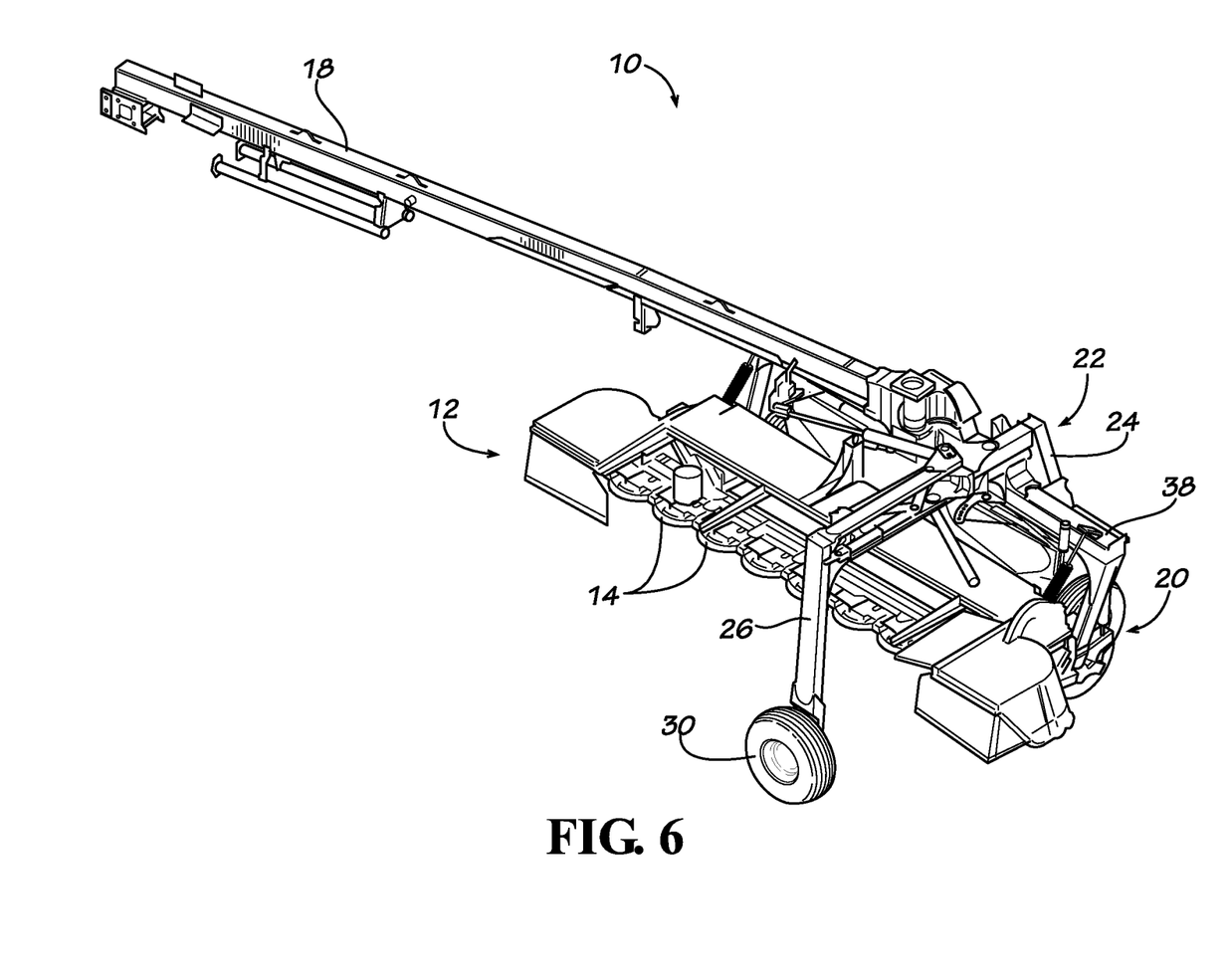
FIG. 6 is yet another perspective view of the mower of FIGS. 1-5, illustrating the tongue of the mower being pivoted to a transport position.

The next step is that tongue 18 is now swung to a transport position as shown in FIG. 6, about a generally vertical axis 50 (identified in FIG. 8). This step has to wait on the full deployment of transport arrangement 22 to prevent mower 10 from tipping to one side. FIGS. 7 and 8 show mower 10 in the transport mode respectively from the operator viewpoint and the right hand side of mower 10.

The steps needed to configure mower 10 for field use are the reverse of those just discussed in order to transition from the transport position to the stowed position of transport arrangement 22. The position of tongue 18 in the transport mode is at a small angle to the tracking of mower 10, as seen in FIG. 7, so as to position the hitch in the desired location for connection with the tractor.

Transport arrangement 22 is coupled to chassis 12 and more particularly to trail frame 38, which is part of chassis 12. The coupling of transport arrangement 22 is offset to the side of the centerline of mower 10. The folding mechanism of transport arrangement 22 is provided to allow at least portions of transport arrangement 22 to be stowed above and to the rear of the trail frame 38 during field operations. Upon placing the center pivot disc mower conditioner 10 (CP-DMC) in the full field left position, the mechanism of transport arrangement 22 rotates about a pivot axis 34 that is parallel to or substantially parallel to the trail frame 38 (or the axis of the field wheels). This action can deploy the left hand (as in transport position) wheel to a position ahead of the header (ahead as in the field position) while still located above the trail frame 38. When this rotation has been completed, a secondary rotation takes place about axis 32; this action is a pivoting action which is above and perpendicular to the trail frame 38 and the field wheel axis. This action rotates wheels 28 and 30 from their position above trail frame 38 to a position below trail frame 38 and in contact with the ground.

When this action is complete, the trail frame/header is then rotated to a position essentially in-line with tongue 18, thus allowing a narrow transport for public roads. The steps to transition from field operation to lateral transport operation are thus: 1. Fully lift chassis 12 to the non-mowing position by extending the field wheels of field suspension system 20; 2. Rotate chassis 12 to the full field left position; 3. Extend the primary lateral transport cylinder to rotate suspension element 26 along with wheel 30 from a position above and behind the trail frame 38 to a position above and ahead of the trail frame 38; 4. Extend the secondary lateral transport cylinder to rotate suspension elements 24 and 26 with wheels 28 and 30 down below the trail frame 38, with wheel 28 being behind the header/trail frame 38 and wheel 30 being in front of the header/trail frame 38; 5. Initiate the system to complete the rotation of chassis 12 to the full lateral transport position and raise the field wheels. The steps to transition from lateral transport to field operation are then to reverse the actions starting with step 5 and work backward to step 1.

The subject disclosure includes the action of rotating the left hand transport wheel 30 from a position above and behind the trail frame 38 to a position ahead of the trail frame 38 and the header about an axis generally parallel to the trail frame 38 and the field wheel axis. There is also the subsequent action (or precedent action depending on which way the transition is proceeding) of rotating the transport wheel from a position above the header/trail frame 38 to a position below the header/trail frame 38, where the left hand transport wheel 30 is ahead of the header with the right hand transport wheel 28 to the rear of the header (in field position) and about an axis 32 perpendicular to the trail frame 38 field wheel axis. The system stows the transport wheels 28 and 30 above and behind the trail frame 38 while having the ability to rotate the transport wheel 30 to a position ahead of the header. Any system can be used to actuate the lateral transport rotations, with hydraulic cylinders being assumed, but the actions can be accomplished with any arrangement of cylinders, actuators, linear motors, rotational motors, to name a few.

Advantages of the subject disclosure include the providing of integrated lateral transport while allowing full rotation of the header for all field conditions with the transport wheels stowed above and behind the trail frame 38. The stowed position keeps the transport wheels completely out of the incoming crop stream, as well as completely out of the crop stream exiting from the conditioner. Further, this system allows for the CPDMC to be balanced during both field and lateral transport operation.

While this disclosure has been described with respect to at least one embodiment, the subject disclosure can be further modified within the spirit and scope of this disclosure. This application is therefore intended to cover any variations, uses, or adaptations of the disclosure using its general principles. Further, this application is intended to cover such departures from the subject disclosure as come within known or customary practice in the art to which this disclosure pertains and which fall within the limits of the appended claims.

What is claimed is:

1. A transport arrangement of an agricultural machine having a chassis, a frame and a field suspension system, the transport arrangement comprising:
   a first suspension element coupled to one of the chassis and the field suspension system, the first suspension element having a first ground engaging wheel coupled to an end of the first suspension element, the first suspension element pivotal about a first axis moving the first ground engaging wheel into and away from contact with the ground; and
   a second suspension element coupled to and pivotal relative to the first suspension element about a second axis, the second suspension element having a second ground engaging wheel coupled to an end of the second suspension element, the second suspension element additionally pivotal about the first axis moving the second ground engaging wheel into and away from contact with the ground, the second ground engaging wheel moved from above the frame to below the frame as the second suspension element is pivoted about the second axis then about the first axis.

2. The transport arrangement of claim 1, wherein contact with the ground by the first and second ground engaging wheels corresponds to a transport mode of operation, and wherein non-contact with the ground by the first and second ground engaging wheels corresponds to a field work mode of operation.

3. The transport arrangement of claim 2, wherein in the field work mode of operation, the first suspension element is proximate to the second suspension element, and wherein the second axis is for pivoting the second suspension element to be proximate to the first suspension element proximate to one side of the agricultural machine.

4. The transport arrangement of claim 3, wherein the one side of the agricultural machine is a rear side of the agricultural machine.

5. The transport arrangement of claim 3, wherein the second suspension element is generally above the first suspension element in the field work mode of operation.

6. The transport arrangement of claim 1, wherein the first axis and the second axis are generally perpendicular to each other.

7. The transport arrangement of claim 1, wherein the first suspension element is longer than the second suspension element.

8. An agricultural mower, comprising:
   a frame;
   a chassis coupled to the frame;
   a pivotal tongue coupled to the chassis; and
   a transport arrangement coupled to the chassis, the transport arrangement including:
   a first suspension element coupled the chassis, the first suspension element having a first ground engaging wheel, the first suspension element pivotal about a first axis to move the first ground engaging wheel into and away from contact with the ground; and
   a second suspension element coupled to and pivotal relative to the first suspension element about a second axis, the second suspension element having a second ground engaging wheel, the second suspension element additionally pivotal about the first axis to move the second ground engaging wheel into and away from contact with the ground, the second ground engaging wheel moved from above the frame to below the frame as the second suspension element is pivoted about the second axis then about the first axis.

9. The agricultural mower of claim 8, wherein contact with the ground by the first and second ground engaging wheels corresponds to a transport mode of operation of the agricultural mower, and wherein non-contact with the ground by the first and second ground engaging wheels corresponds to a field work mode of operation of the agricultural mower.

10. The agricultural mower of claim 9, wherein in the field work mode of operation, the first suspension element is proximate to the second suspension element, and both the first suspension element and the second suspension element are proximate to one side of the agricultural mower.

11. The agricultural mower of claim 10, wherein the one side of the agricultural mower is a rear side of the agricultural mower.

12. The agricultural mower of claim 10, wherein the second suspension element is generally above the first suspension element in the field work mode of operation.

13. The agricultural mower of claim 8, wherein the first axis and the second axis are generally perpendicular to each other.

14. The agricultural mower of claim 9, wherein the chassis is substantially carried by the transport arrangement when in the transport position.

15. The agricultural mower of claim 8, wherein the first suspension element is longer than the second suspension element.

16. The agricultural mower of claim 9, wherein the pivoting tongue is for pivoting to a predetermined position when the transport arrangement transitions from the field work mode of operation to the transport mode of operation and from the transport mode of operation to the field work mode of operation.

17. An agricultural mower, comprising:
   a chassis;
   a field suspension system coupled to the chassis;
   a pivotal tongue coupled to the chassis; and
   a transport arrangement coupled to the chassis, the transport arrangement including:
   a first suspension element coupled to the field suspension system, the first suspension element having a first ground engaging wheel, the first suspension element pivotal about a first axis to move the first ground engaging wheel into and away from contact with the ground; and a second suspension element coupled to and pivotal relative to the first suspension element about a second axis, the second suspension element having a second ground engaging wheel, the second suspension element additionally pivotal about the first axis to move the second ground engaging wheel into and away from contact with the ground, the second ground engaging wheel moved from above the chassis to below the chassis as the second suspension element is pivoted about the second axis then about the first axis.

18. The agricultural mower of claim 17, wherein in a field work mode of operation, the first suspension element is proximate to the second suspension element, and both the first suspension element and the second suspension element are proximate to one side of the agricultural mower.

19. The agricultural mower of claim 18, wherein the one side of the agricultural mower is a rear side of the agricultural mower.

20. The agricultural mower of claim 18, wherein the second suspension element is generally above the first suspension element in the field work mode of operation.

* * * * *